July 11, 1939.  A. B. GARDELLA  2,165,630

GLASS CAP STRUCTURE FOR PERCOLATOR COVERS

Filed Dec. 11, 1937

INVENTOR
ALBERT B. GARDELLA
BY
Brockett, Hyde, Higley & Meyer
ATTORNEYS

Patented July 11, 1939

2,165,630

UNITED STATES PATENT OFFICE 2,165,630

GLASS CAP STRUCTURE FOR PERCOLATOR COVERS

Albert B. Gardella, Cleveland, Ohio, assignor of one-half to George C. Guckes, Lakewood, Ohio Application December 11, 1937, Serial No. 179,220

1 Claim. (Cl. 53—3)

This invention relates to glass cap structures for closing the centrally disposed openings of metal percolator covers.

The general object of the present invention is the provision of a glass cap structure having improved means for maintaining the glass cap thereof in assembly with a percolator cover, said means being of simple and inexpensive form and of such character that such assembly can be easily, quickly and conveniently made, and when made, will be effectively maintained.

As is well known, the openings of percolator covers vary in size, and such openings frequently become enlarged during use of the percolators. A further object of the present invention, therefore, is the provision of a glass cap structure which is adapted for use with percolator covers having openings of varying size, including minimum sized openings, all as will hereinafter more fully appear.

Figure 2:
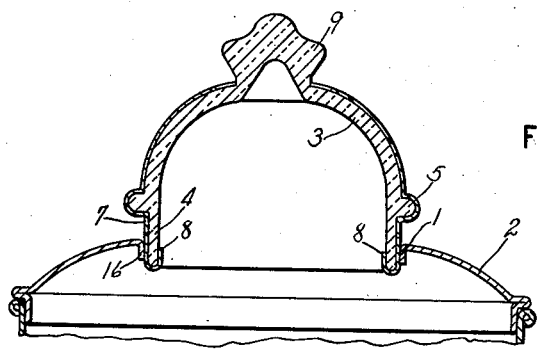
Figure 3:
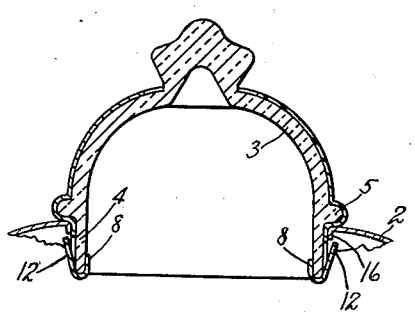
Figure 1:
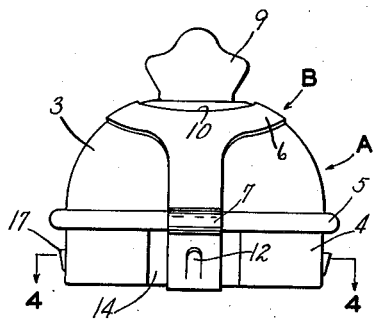
Figure 5:
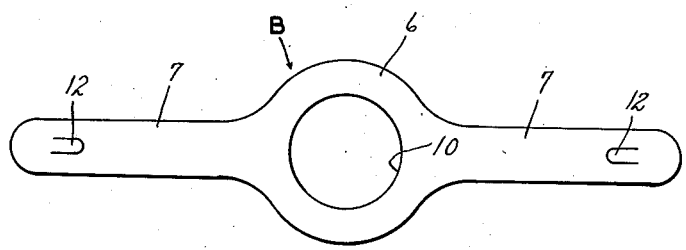
Figure 4:
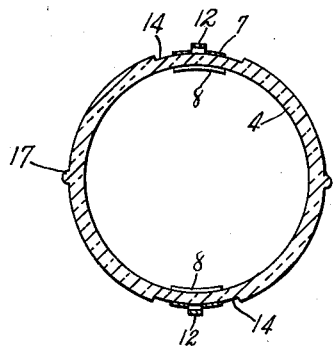

The present invention will be readily understood from the following description thereof, reference being had to the accompanying drawing, in which Fig. 1 is a side view of a glass cap structure embodying the present invention; Fig. 2 is a central vertical sectional view of such cap structure and a metal percolator cover, the cap structure and the percolator cover being in partially assembled relationship; Fig. 3 is a view similar to Fig. 2 but showing the cap structure and the percolator cover in fully assembled relationship; Fig. 4 is a cross-sectional view of the cap structure, on the line 4—4, Fig. 1; and Fig. 5 is a top plan view of the metal strip of the cap structure, in its initial flat form.

Before the present invention is described in detail, it is to be understood that such invention is not limited to the details of construction and/or the specific arrangements of parts herein illustrated and/or described, as the invention obviously may take other forms. It also is to be understood that the phraseology or terminology herein employed is for the purpose of description and not of limitation, there being no intention and no desire to limit the present invention as herein disclosed and as defined in the appended claim, beyond the requirements of the prior art.

As here shown, the present improved glass cap structure, for closing the centrally disposed and generally circular opening 1 of the metal percolator cover 2, includes a suitable one-piece glass cap A and a suitable one-piece metal strip B. The glass cap A comprises a generally dome-shaped top portion 3, a generally cylindrical bottom portion 4 and an intermediate abutment portion 5, here shown as a simple annular flange. The intermediate portion 6 of the metal strip B extends across the top portion 3 of the glass cap A and the two end portions 7 of said strip extend downwardly over the cap abutment portion or flange 5 and downwardly along the generally cylindrical bottom portion 4 of the cap. The securement of the metal strip B to the glass cap A is here made by bending inwardly and upwardly, around the lower edge of the cap bottom portion 4, the ends 8 of the metal strip. Inasmuch as the top portion 3 of the present glass cap A is provided with a centrally disposed upstanding knob 9, as is usual in structures of this character, the intermediate portion 6 of the metal strip B is here shown as of increased width, and is provided with a suitable aperture 10, best shown in Fig. 5, for the reception of said knob.

To enable the present cap structure to be securely maintained in assembly with a percolator cover, such as the percolator cover 2, in closing position relative to its centrally disposed opening, such as the generally circular opening 1 of the percolator cover 2, the two end portions 7 of the metal strip of the present cap structure are provided with suitable resilient fingers 12, either separate fingers welded or otherwise suitably secured to said strip end portions or, as here shown, fingers integral with said strip end portions and provided by partially cutting and pressing said fingers outwardly therefrom. The fingers 12, because of their inherent tendency to spring outwardly, automatically position themselves beneath the percolator cover, after the cap structure has been fully assembled therewith, and said fingers thus securely and effectively maintain such assembly, as will be readily understood.

Inasmuch as the metal covers of percolators now on the market have centrally disposed openings of varying size, a replacement glass cap structure for closing such an opening preferably should be of such size and of such character that it may be used with all such percolator covers, notwithstanding the variation in the size of their openings. As will now fully appear, the present cap structure is of such preferred form, its size and character being such that it is suitable for use in closing the opening of the cover of any percolator now on the market, regardless of the size of the centrally disposed opening of such cover.

In order to enable the present cap structure to be used with those percolator covers having openings of the smallest size, such as with the percolator cover 2 here shown, and yet be suitable for use with those percolator covers having openings of the largest size, the generally cylindrical bottom portion 4 of the glass cap A of the present cap structure is provided with suitable grooves or recesses 14 for the reception of the strip end portions 7, portions which carry and from which are here struck the assembly-maintaining fingers 12.

As best shown in Fig. 2, the depth of the grooves or recesses 14 is at least as great as the thickness of the strip end portion 7, so that when the generally cylindrical bottom portion of the present cap structure is inserted into the opening 1 of the percolator cover 2, as in Fig. 2, in assembling such cap structure with said percolator cover, the strip end portion 7, including the fingers 12 thereof, lie wholly within the grooves or recesses 14 of such cap structure bottom portion, said fingers being momentarily pressed inwardly into the planes of the strip end portions 7 by such assembling operation. As a result, the strip end portions 7, including the fingers 12 thereof, do not necessitate a larger percolator cover opening than is actually required for the bottom portion 4 of the glass cap A, as will be readily understood.

When the present cap structure is fully assembled with a percolator cover, as in Fig. 3, the annular abutment portion or flange 5 of said cap structure rests or seats upon such percolator cover and thereby prevents said cap structure from falling downwardly through the centrally disposed opening thereof. The resilient fingers 12 of the cap structure, arranged in opposed relationship and extending outwardly beneath the percolator cover, effectively prevent the cap structure from upwardly separating from the percolator cover. As a result, the assembly of the cap structure with the percolator cover is securely and effectively maintained.

As will be readily understood, the fingers 12 of the present cap structure are quite sufficient to securely maintain such cap structure in assembly with a percolator cover. As many percolator covers are provided with a depending cam-edged flange around their centrally disposed openings, such as the depending flange 16 of the percolator cover 2, the generally cylindrical bottom portion 4 of the glass cap A of the present cap structure may be provided with integral or other suitable projections 17 for cooperation with the cam edge of said depending flange in effecting a bayonet joint connection of the cap structure with the percolator cover, a connection which alone is not sufficient but which obviously may be used in conjunction with the assembly-maintaining fingers 12 of the present cap structure, if desired.

Further features and advantages of the present invention will be apparent to those skilled in the art to which it relates.

What I claim is:

A glass cap structure for closing the opening of a metal percolator cover, said cap structure comprising a one-piece glass cap and a one-piece resilient metal strip for maintaining said cap in assembly with said percolator cover, said cap having a top portion and a generally cylindrical bottom portion adapted to extend through the opening of said percolator cover and an intermediate abutment portion adapted to seat upon said percolator cover, said metal strip having its intermediate portion extending across the outer surface of the cap top portion and having its end portions extending down along the outer surfaces of the cap bottom portion and thence inwardly therebeneath, thereby securing said cap and said strip in assembled relation, the bottom portion of said cap being provided with two diametrically opposed longitudinally extending grooves for the reception of said strip end portions, the depth of said grooves being at least as great as the thickness of said strip end portions, and each of said strip end portions being provided with a resilient finger struck therefrom and adapted upon assembly of the cap structure with the percolator cover to spring outwardly and upwardly beneath such percolator cover and maintain such assembly.

ALBERT B. GARDELLA.